(12) United States Patent
Sun

(10) Patent No.: US 11,809,295 B2
(45) Date of Patent: Nov. 7, 2023

(54) NODE MODE ADJUSTMENT METHOD FOR WHEN STORAGE CLUSTER BBU FAILS AND RELATED COMPONENT

(71) Applicant: Inspur Suzhou Intelligent Technology Co., Ltd., Suzhou (CN)

(72) Inventor: Minggang Sun, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 17/767,348

(22) PCT Filed: Jan. 21, 2020

(86) PCT No.: PCT/CN2020/073404
§ 371 (c)(1),
(2) Date: Apr. 7, 2022

(87) PCT Pub. No.: WO2021/098041
PCT Pub. Date: May 27, 2021

(65) Prior Publication Data
US 2022/0391298 A1    Dec. 8, 2022

(30) Foreign Application Priority Data
Nov. 22, 2019    (CN) .......................... 201911159348.4

(51) Int. Cl.
*G06F 11/30* (2006.01)
*G06F 3/06* (2006.01)

(52) U.S. Cl.
CPC ........ *G06F 11/3034* (2013.01); *G06F 3/0607* (2013.01); *G06F 3/0634* (2013.01); *G06F 3/0689* (2013.01); *G06F 11/3055* (2013.01)

(58) Field of Classification Search
CPC .. G06F 11/3034; G06F 3/0607; G06F 3/0634; G06F 3/0689; G06F 11/3055
See application file for complete search history.

(56) References Cited

U.S. PATENT DOCUMENTS 10,481,626 B1 *  11/2019  Tang .................. H02M 1/32
2016/0283385 A1 *  9/2016  Boyd .................. G06F 9/4411
(Continued)

FOREIGN PATENT DOCUMENTS

| CN | 105302498 | 2/2016 |
| CN | 109085909 | 12/2018 |

(Continued)

OTHER PUBLICATIONS

The State Intellectual Property Office of People's Republic of China, First Office Action, Application No. or Publication No. 201911159348.4, dated Oct. 29, 2020, pp. 1-13.

(Continued)

*Primary Examiner* — Mark A Giardino, Jr.
(74) *Attorney, Agent, or Firm* — David R. Stevens; Stevens Law Group

(57) ABSTRACT

A node mode adjustment method for when a storage cluster BBU fails and related component. The storage cluster comprises multiple IO GROUPs; each IO GROUP comprises two nodes, and each node is connected to a corresponding BBU of the node. The method comprises: monitoring the status of each BBU in the storage cluster; after detecting that any one BBU has failed, when it is determined that the BBU connected to the peer node of the node to which the failed BBU is connected has not failed, and it is determined that the storage cluster is not downgraded, maintaining in a write-back mode the node connected to the BBU detected to have failed and the peer node of said node. Applying the solution of the present application will help to ensure that the storage cluster has the advantages of high availability and high IO performance.

7 Claims, 3 Drawing Sheets

(56) References Cited

U.S. PATENT DOCUMENTS

2017/0132129 A1\* 5/2017 Ogasawara ......... G06F 12/0868
2017/0199246 A1\* 7/2017 Hindle ................. G01R 31/386
2019/0121708 A1   4/2019 Amano

FOREIGN PATENT DOCUMENTS

| CN | 109582502 | 4/2019 |
| CN | 109634398 | 4/2019 |
| CN | 109656754 | 4/2019 |

OTHER PUBLICATIONS

China National Intellectual Property Administration, International Search Report, PCT/CN2020/073404, dated Aug. 25, 2020, pp. 1-5.
Patent Cooperation Treaty, Written Opinion of the International Searching Authority, PCT/CN2020/073404, dated Aug. 25, 2020, pp. 1-6.

\* cited by examiner

NODE MODE ADJUSTMENT METHOD FOR WHEN STORAGE CLUSTER BBU FAILS AND RELATED COMPONENT

CROSS-REFERENCE TO RELATED APPLICATIONS

This application claims priority to Chinese Patent Application No. 201911159348.4, entitled "NODE MODE ADJUSTMENT METHOD FOR WHEN STORAGE CLUSTER BBU FAILS AND RELATED COMPONENTS" and filed with the Chinese Patent Office on Nov. 22, 2019, the entire contents of which are incorporated herein by reference.

TECHNICAL FIELD

The present disclosure relates to the field of storage technologies, and in particular, to a node mode adjustment method for a storage cluster in the case of BBU failure and related components.

BACKGROUND

A Redundant Array of Independent Drives (RAID) is a huge-capacity drive group composed of a plurality of independent drives, which may expand hard drive capacity and improve reliability of hard drive data. With the development of computers and big data, RAID-based storage clusters are more and more widely used.

A host is connected to a storage device and a server or a computer using the storage device.

In a storage cluster, two nodes form one IO GROUP to ensure high availability of a system. Each of the two nodes is connected to one port of a dual-port hard drive. Such hard drives form one or more RAIDs. The storage cluster may include a plurality of IO GROUPs. Two nodes in each IO GROUP are peer nodes. Nodes in the cluster may communicate with one another. The node described in the present application is a storage controller, including members such as a CPU, an internal memory, and an SAS interface, which may realize IO reading and writing of the storage cluster.

A Battery Backup Unit (BBU) has a backup function and may protect security of data after power failure of the system. Specifically, after the system is powered down, the BBU may continue to supply power to ensure that a variety of important data in the system is safely saved.

In the current storage field, BBUs are bound to nodes in a storage cluster based on cost and reliability considerations. That is, for each IO GROUP in the storage cluster, each of the two nodes in the IO GROUP is connected to one BBU. A BBU can provide backup for only the node connected to the BBU.

When a BBU fails, the system may report a fatal error code. The node connected to the BBU may switch to a maintenance mode, an IO of the node is stopped, and a peer node of the node may switch to a write-through mode. Since one node switches to the maintenance mode, the hard drive may have one IO link and the cluster does not have the advantage of high availability. Since the other normal node switches to the write-through mode, the IO performance of the cluster may be degraded, thereby affecting user services.

Based on the above, how to effectively ensure the high availability and IO performance of the storage cluster when a BBU fails in the storage cluster is an urgent technical problem to be solved currently for those skilled in the art.

SUMMARY

An objective of the present disclosure is to provide a node mode adjustment method for a storage cluster in the case of BBU failure and related components, so as to effectively ensure high availability and IO performance of the storage cluster when a BBU fails in the storage cluster.

In order to solve the above technical problems, the present disclosure provides the following technical solutions.

A node mode adjustment method for a storage cluster in the case of BBU failure, wherein the storage cluster includes a plurality of IO GROUPs, each of the IO GROUPs includes two nodes, and each node is connected to a BBU corresponding to the node, the method including:

monitoring a state of each BBU in the storage cluster; and after detection of any failed BBU, when it is determined that a BBU connected to a peer node of the node to which the failed BBU is connected does not fail and it is determined that the storage cluster is not degraded, maintaining the node connected to the BBU detected to be failed and the peer node of the node in a write-back mode.

Preferably, subsequent to the step of maintaining the node connected to the BBU detected to be failed and the peer node of the node in a write-back mode, the method further includes:

outputting first prompt information indicating that a current failure state is nonfatal.

Preferably, after detection of any failed BBU, the method further includes:

when it is determined that the BBU connected to the peer node of the node to which the failed BBU is connected fails, switching the two nodes in the IO GROUP to a maintenance mode.

Preferably, after detection of any failed BBU, the method further includes:

when it is determined that the BBU connected to the peer node of the node to which the failed BBU is connected does not fail and it is determined that the storage cluster is in a degraded state, switching the node connected to the failed BBU in the IO GROUP to a maintenance mode, and switching the node connected to the non-failed BBU to a write-through mode.

Preferably, subsequent to the step of switching the two nodes in the IO GROUP to a maintenance mode or subsequent to the step of switching the node connected to the failed BBU in the IO GROUP to a maintenance mode, and switching the node connected to the non-failed BBU to a write-through mode, the method further includes:

outputting second prompt information indicating that a current failure state is fatal.

A node mode adjustment system for a storage cluster in the case of BBU failure, wherein the storage cluster includes a plurality of IO GROUPs, each of the IO GROUPs includes two nodes, and each node is connected to a BBU corresponding to the node, the system including:

a BBU monitoring module configured to monitor a state of each BBU in the storage cluster; and a first mode adjustment module configured to, after the BBU monitoring module detects any failed BBU, when it is determined that a BBU connected to a peer node of the node to which the failed BBU is connected does not fail and it is determined that the storage cluster is not degraded, maintain the node connected to the BBU detected to be failed and the peer node of the node in a write-back mode.

Preferably, the system further includes:

a second mode adjustment module configured to, after the BBU monitoring module detects any failed BBU, when it is determined that the BBU connected to the peer node of the node to which the failed BBU is connected fails, switch the two nodes in the IO GROUP to a maintenance mode.

Preferably, the system further includes:

a third mode adjustment module configured to, after the BBU monitoring module detects any failed BBU, when it is determined that the BBU connected to the peer node of the node to which the failed BBU is connected does not fail and it is determined that the storage cluster is in a degraded state, switch the node connected to the failed BBU in the IO GROUP to a maintenance mode, and switch the node connected to the non-failed BBU to a write-through mode.

A node mode adjustment device for a storage cluster in the case of BBU failure, the device including:

a memory configured to store a computer program; and a processor configured to execute the computer program to perform steps of the node mode adjustment method for a storage cluster in the case of BBU failure according to any one of the above.

A computer-readable storage medium, wherein the computer-readable storage medium stores a computer program, and when the computer program is executed by a processor, steps of the node mode adjustment method for a storage cluster in the case of BBU failure according to any one of the above are performed.

By use of the technical solutions according to the embodiments of the present disclosure, the applicant considers that, when BBUs of two nodes in the IO GROUP fail or a BBU connected to a single node fails, but a storage cluster is in a degraded state, a node mode is not changed, if there is a utility power outage or the like, security of user data cannot be ensured after the storage cluster restarts, and user data may be lost. However, when the BBU connected to the single node in the IO GROUP fails and the storage cluster is not degraded, cache data of the storage cluster is not lost after the restart since a dual-node mirroring manner is adopted for the cache data. Even if the failed BBU corresponds to a selected node, consistency between the user data and parity data on a stripe may also be ensured through data reconstruction. That is, when the RAID is not degraded, the parity data of the stripe may be reconstructed based on stripe data in each drive specified by an APU stripe address in APU data to ensure the consistency between the stripe data and the parity data. Then, a write failure is returned to a host to require the host to resend a write IO.

Therefore, in the solutions according to the present application, a state of each BBU in the storage cluster is monitored, and after detection of any failed BBU, when it is determined that a BBU connected to a peer node of the node to which the failed BBU is connected does not fail and it is determined that the storage cluster is not degraded, the node connected to the BBU detected to be failed and the peer node of the node are maintained in a write-back mode. In this case, on the premise of ensuring the security of the user data, the write-back mode enables the storage cluster to still have the advantage of high availability without degrading the IO performance of the cluster and affecting user services.

BRIEF DESCRIPTION OF DRAWINGS

In order to more clearly illustrate the technical solutions in embodiments of the present disclosure or the prior art, the accompanying drawings used in the description of the embodiments or the prior art will be briefly introduced below. It is apparent that the accompanying drawings in the following description are only some embodiments of the present disclosure, and other drawings can be obtained by those of ordinary skill in the art from the provided drawings without creative efforts.

DESCRIPTION OF EMBODIMENTS

Figure 1:
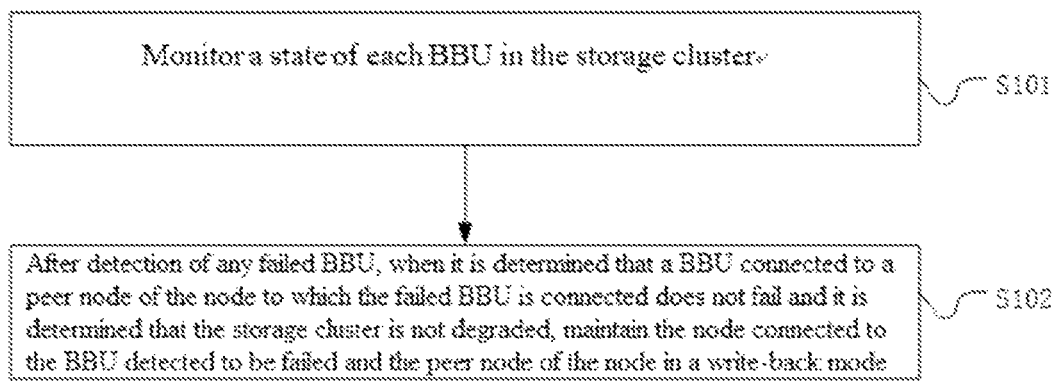
FIG. 1 is a flowchart of implementation of a node mode adjustment method for a storage cluster in the case of BBU failure according to the present disclosure.

The core of the present disclosure is to provide a node mode adjustment method for a storage cluster in the case of BBU failure, which helps ensure high availability and high IO performance of the storage cluster.

In order to make those skilled in the art better understand the solutions of the present disclosure, the following is a further detailed description of the present disclosure with reference to the accompanying drawings and specific implementations. Obviously, the described embodiments are only some of rather than all of the embodiments of the present disclosure. Based on the embodiments of the present disclosure, all other embodiments obtained by those of ordinary skill in the art without creative efforts fall within the protection scope of the present disclosure.

The applicant considers that there are two types of data to be stored during BBU backup in the storage cluster, of which one is user cache data and the other is atomic parity update (APU) data of an RAID. A dual-node mirroring manner is adopted for the cache data, and therefore, for any IO GROUP, the cache data may not be lost when the storage cluster encounters an exception, such as a utility power outage, provided that the BBU of any node in the IO GROUP may back up power normally.

APU is a measure taken by the RAID to protect parity data generated by write requests, which may restore stripe consistency in case of system exceptions, such as power failure or controller failure. The APU data includes APU stripe addresses, APU user data and APU parity data. When a utility power outage occurs in the storage cluster, the nodes may run continuously for a period of time due to the existence of the BBUs. However, the drives in a system stop running immediately after the utility power outage. A node, when receiving write data from a host, may first store the APU data in an NVRAM of the node based on a task assigned by the storage cluster. The NVRAM is an RAM that prevents data loss in case of power failure. After completion, the APU user data and the APU parity data are flushed to the drive to achieve an atomic operation. If the power failure occurs in the process that the data is flushed to the drive after written to the NVRAM of the node, the user data is inconsistent with the parity data in the drive at this point, initialization of the RAID fails, and then, the host fails in reading. In this case, the user data on the stripe is required to be read, the parity data is recalculated and then written to the drive to ensure the consistency between the user data and the parity data.

In the storage cluster, the APU stripe addresses may be written to two nodes in an IO GROUP. However, for a certain write request, complete APU data may be written to only one node. If data is written to the two nodes, the two nodes are required to synchronize a large amount of data, which may increase system delay. The node to which the complete APU data is written is called a selected node. Due to the service life of the NVRAM, the selected node is evenly distributed. That is, the two nodes are selected as the selected node with roughly equal probabilities.

If a BBU connected to one node fails, subsequent data recovery after the storage cluster restarts involves two situations.

In a first situation, the node corresponding to the BBU failure is not the selected node. That is, before the storage cluster restarts, backup of the selected node to which the complete APU data is written is normally completed, and since the BBU of the selected node is normal, the cache data may not be lost. Therefore, there is no risk of loss of user data in this situation.

In a second situation, the node corresponding to the BBU failure is the selected node. The cache data and the APU stripe addresses in the APU data are stored in the peer node of the selected node. If the RAID is not degraded, according to APU stripe address information of the node, the data written to the stripe is read and recalculated to reconstruct parity data. In this way, it can be ensured that the user data is consistent with the parity data on the stripe. After that, a write failure is returned to the host and the host is required to resend a write IO. That is, when the RAID is not degraded, the parity data of the stripe may be reconstructed. Correspondingly, if the RAID is in the degraded state, when the data written to the stripe is read for recalculation according to the APU stripe address information of the node, some stripe information is unreadable due to the degradation of the RAID, and therefore, the consistency between the user data and the parity data on the stripe cannot be ensured.

Based on the above analysis, referring to FIG. 1, FIG. 1 is a flowchart of implementation of a node mode adjustment method for a storage cluster in the case of BBU failure according to the present disclosure. The storage cluster includes a plurality of IO GROUPs, each of the IO GROUPs includes two nodes, and each node is connected to a BBU corresponding to the node. The node mode adjustment method for a storage cluster in the case of BBU failure may include the following steps.

In step S101, a state of each BBU in the storage cluster is monitored.

Each IO GROUP includes two BBUs. In the present application, a state of each BBU in each IO GROUP is required to be monitored. In practical applications, the state of each BBU may be generally monitored according to a preset monitoring cycle. A specific value of the monitoring cycle may also be set and adjusted as required.

In step S102, after detection of any failed BBU, when it is determined that a BBU connected to a peer node of the node to which the failed BBU is connected does not fail and it is determined that the storage cluster is not degraded, the node connected to the BBU detected to be failed and the peer node of the node are maintained in a write-back mode.

The storage cluster generally includes a plurality of IO GROUPs. Two nodes in each IO GROUP are peer nodes. For example, if it is monitored that a BBU corresponding to Node A in IO GROUP 2 fails, there is a need to judge whether a BBU corresponding to Node B in IO GROUP 2 fails. If it is determined that the BBU corresponding to Node B does not fail, it may be judged whether the storage cluster is degraded. Certainly, in other specific occasions, whether the storage cluster is degraded may be judged first, which does not affect the implementation of the present disclosure.

It is to be noted that, in the solution of the present application, the BBU corresponding to the node is also the BBU connected to the node. Each node in the storage cluster has one BBU uniquely corresponding to the node.

The storage cluster in the present application is an RAID storage cluster. Judging whether the storage cluster is degraded is judging whether the RAID is in a degraded state. If the RAID is not in the degraded state, in the present application, the node connected to the BBU detected to be failed and the peer node of the node may be maintained in the write-back mode. That is, compared with the conventional solution in which the node connected to the failed BBU may be switched to a maintenance mode and the peer node of the node is switched to a write-through mode, in the solution of the present application, the write-back mode is still maintained. Therefore, in this case, the storage cluster still has the advantage of high availability without degrading the IO performance of the cluster and affecting user services.

Moreover, when the node connected to the BBU detected to be failed and the peer node of the node are both maintained in the write-back mode, as can be known from the above analysis, the user data may not be lost.

Specifically, assuming that the node with BBU failure is not the selected node, the BBU of the selected node does not fail, and even if an exception such as a utility power outage occurs, since the cache data and the complete APU data are stored in the selected node, data may be restored when the storage cluster performs rewriting by using the data stored in the selected node, and there is no risk of loss of the user data.

It is assumed that the node with BBU failure is the selected node and the cache data and the APU stripe addresses are stored in a non-selected node. Reconstruction of the parity data by using the APU stripe address information stored in the non-selected node is not affected whether the non-selected node is in the write-through mode or the write-back mode. The reconstruction of the parity data ensures the consistency between the user data and the parity data on the stripe, and then the host may be required to resend a write M.

In a specific implementation of the present disclosure, subsequent to step S102, the method may further include:

outputting first prompt information indicating that a current failure state is nonfatal, so that an operator may learn the current failure state in time. Moreover, it may be understood that, since the node may be maintained in a write-back mode in the failure state in the application, the corresponding failure state is at a low level.

In a specific implementation of the present disclosure, after detection of any failed BBU, the method may further include:

when it is determined that the BBU connected to the peer node of the node to which the failed BBU is connected fails, switching the two nodes in the IO GROUP to a maintenance mode.

The applicant considers that, when BBUs connected to two nodes in one IO GROUP both fail, the two nodes cannot use their respective BBUs to back up power if the system is abnormal; and for example, if a utility power outage occurs, the cache data and the APU data may be lost, the parity data cannot be reconstructed, and the cache data cannot be restored. Therefore, in this case, the nodes connected to the two failed BBUs in the IO GROUP respectively are required to be switched to the maintenance mode. That is, IO of the two nodes is stopped to ensure security of the user data.

In a specific implementation of the present disclosure, after detection of any failed BBU, the method may further include:

when it is determined that the BBU connected to the peer node of the node to which the failed BBU is connected does not fail and it is determined that the storage cluster is in a degraded state, switching the node connected to the failed BBU in the IO GROUP to a maintenance mode, and switching the node connected to the non-failed BBU to a write-through mode.

In the implementation, if the node corresponding to the failed BBU is a non-selected node, the security of the user data may be ensured since the cache data and the complete APU data are stored in the selected node. However, if the node corresponding to the failed BBU is the selected node, after the storage cluster restarts, parity data of the stripe is required to be reconstructed by using the APU stripe address in the non-selected node. Whether the reconstruction is successful depends on a state of the storage cluster. When the storage cluster is in the degraded state, the parity data cannot be reconstructed. As a result, data on the stripe is inconsistent. Therefore, the user data is lost and the security of the user data cannot be ensured.

Therefore, when it is determined that the BBU connected to the peer node of the node to which the failed BBU is connected does not fail and it is determined that the storage cluster is in the degraded state, the node connected to the failed BBU in the IO GROUP is required to be switched to the maintenance mode, and the node connected to the non-failed BBU is switched to the write-through mode, thereby ensuring the security of the user data. Certainly, in the implementation, the storage cluster does not have the advantage of high availability and the IO performance may be greatly degraded at the same time.

In a specific implementation of the present disclosure, when it is determined that BBUs connected to two nodes in one IO GROUP both fail and after the two nodes in the IO GROUP are switched to the maintenance mode, second prompt information indicating that a current failure state is fatal may be outputted, so as to remind the operator of the current failure state. Moreover, it may be understood that the output of the second prompt information indicates the degradation of the performance of the storage cluster, and thus the failure state is at a high level.

Certainly, when it is determined that only a BBU of one node in one IO GROUP fails, but the storage cluster is in the degraded state, that is, the RAID is in the degraded state, after the node connected to the failed BBU in the IO GROUP is switched to the maintenance mode and the node connected to the non-failed BBU is switched to the write through mode, the second prompt information indicating that a current failure state is fatal may also be outputted.

By use of the technical solutions according to the embodiments of the present disclosure, the applicant considers that, when BBUs of two nodes in the IO GROUP fail or a BBU connected to a single node fails, but a storage cluster is in a degraded state, a node mode is not changed, if there is a utility power outage or the like, security of user data cannot be ensured after the storage cluster restarts, and the user data may be lost. However, when the BBU connected to the single node in the IO GROUP fails and the storage cluster is not degraded, cache data of the restarted storage cluster is not lost since a dual-node mirroring manner is adopted for the cache data. Even if the failed BBU corresponds to a selected node, consistency between the user data and parity data on a stripe may also be ensured through data reconstruction. That is, when the RAID is not degraded, the parity data of the stripe may be reconstructed based on stripe data in each drive specified by an APU stripe address in APU data to ensure the consistency between the stripe data and the parity data. Then, a write failure is returned to the host to require the host to resend a write IO.

Therefore, in the solutions according to the present application, a state of each BBU in the storage cluster is monitored, and after detection of any failed BBU, when it is determined that a BBU connected to a peer node of the node to which the failed BBU is connected does not fail and it is determined that the storage cluster is not degraded, the node connected to the BBU detected to be failed and the peer node of the node are maintained in a write-back mode. On the premise of ensuring the security of the user data, the write-back mode enables the storage cluster to still have the advantage of high availability without degrading the IO performance of the cluster and affecting user services.

Corresponding to the method embodiment above, an embodiment of the present disclosure further provides a node mode adjustment system for a storage cluster in the case of BBU failure, which may be cross-referenced with the above.

Figure 2:
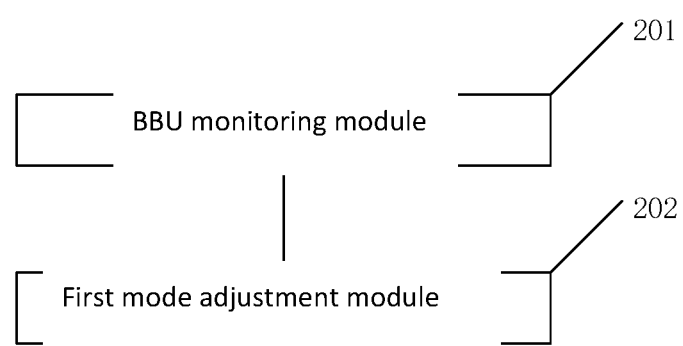
FIG. 2 is a schematic structural diagram of a node mode adjustment system for a storage cluster in the case of BBU failure according to the present disclosure.

Referring to FIG. 2, which is a schematic structural diagram of a node mode adjustment system for a storage cluster in the case of BBU failure according to the present disclosure. The storage cluster includes a plurality of IO GROUPs, each of the IO GROUPs includes two nodes, and each node is connected to a BBU corresponding to the node. The node mode adjustment system for a storage cluster in the case of BBU failure may include the following modules.

A BBU monitoring module 201 is configured to monitor a state of each BBU in the storage cluster.

A first mode adjustment module 202 is configured to, after the BBU monitoring module 201 detects any failed BBU, when it is determined that a BBU connected to a peer node of the node to which the failed BBU is connected does not fail and it is determined that the storage cluster is not degraded, maintain the node connected to the BBU detected to be failed and the peer node of the node in a write-back mode.

In a specific implementation of the present disclosure, the system further includes:

a first prompt information output module configured to output first prompt information indicating that a current failure state is nonfatal after the first mode adjustment module 202 maintains the node connected to the BBU detected to be failed and the peer node of the node in the write-back mode.

In a specific implementation of the present disclosure, the system further includes:

a second mode adjustment module configured to, after the BBU monitoring module 201 detects any failed BBU, when it is determined that the BBU connected to the peer node of the node to which the failed BBU is connected fails, switch the two nodes in the IO GROUP to a maintenance mode.

In a specific implementation of the present disclosure, the system further includes:

a third mode adjustment module configured to, after the BBU monitoring module 201 detects any failed BBU, when it is determined that the BBU connected to the peer node of the node to which the failed BBU is connected does not fail and it is determined that the storage cluster is in a degraded state, switch the node connected to the failed BBU in the IO GROUP to a maintenance mode, and switch the node connected to the non-failed BBU to a write-through mode.

In a specific implementation of the present disclosure, the system further includes:

a second prompt information output module configured to output second prompt information indicating that a current failure state is fatal after the second mode adjustment module switches the two nodes in the IO GROUP to the maintenance mode or after the third mode adjustment module switches the node connected to the failed BBU in the IO GROUP to the maintenance mode and switches the node connected to the non-failed BBU to the write-through mode.

Corresponding to the method and system embodiments above, embodiments of the present disclosure further provide a node mode adjustment device for a storage cluster in the case of BBU failure and a computer-readable storage medium, which may be cross-referenced with the above. The computer-readable storage medium stores a computer program. When the computer program is executed by a processor, steps of the node mode adjustment method for a storage cluster in the case of BBU failure according to any one of the above embodiments are performed. The computer-readable storage medium described herein includes a random access memory (RAM), an internal memory, a read-only memory (ROM), an electrically programmable ROM, an electrically erasable programmable ROM, a register, a hard drive, a removable drive, a CD-ROM, or any other forms of storage media well known in the art.

Figure 3:
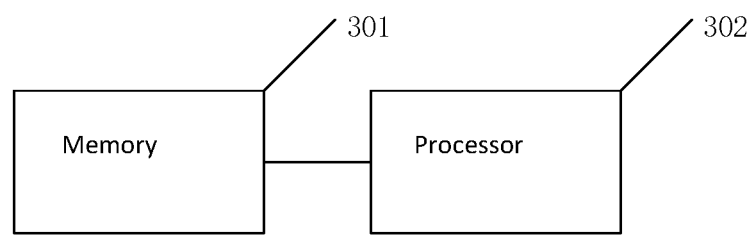
FIG. 3 is a schematic structural diagram of a node mode adjustment device for a storage cluster in the case of BBU failure according to the present disclosure.

Referring to FIG. 3, the node mode adjustment device for a storage cluster in the case of BBU failure may include:

a memory 301 configured to store a computer program; and a processor 302 configured to execute the computer program to perform steps of the node mode adjustment method for a storage cluster in the case of BBU failure according to any one of the above embodiments.

It is to be further noted that the relational terms herein such as first and second are used only to differentiate an entity or operation from another entity or operation, and do not require or imply any actual relationship or sequence between these entities or operations. Moreover, the terms "include", "comprise", and any other variations thereof are intended to cover a non-exclusive inclusion. Therefore, a process, method, article, or device that includes a series of elements not only includes such elements, but also includes other elements not specified expressly, or may include elements inherent to the process, method, article, or device. If no more limitations are made, an element limited by an expression "including a/an . . . " does not exclude other same elements existing in the process, method, article, or device that includes the element.

Those of ordinary skill in the art may be further aware that the units and algorithmic steps of the examples described in combination with the embodiments disclosed herein can be implemented by electronic hardware, computer software, or a combination thereof. To clearly describe the interchangeability between the hardware and the software, compositions and steps of each example have been has been generally described according to functions in the above descriptions. Whether these functions are performed by hardware or software depends on a specific application and design constraints of the technical solution. Those skilled in the art may use different methods to implement the described functions for each particular application, but it should not be considered that the implementation goes beyond the scope of the present disclosure. The principle and implementations of the present disclosure are illustrated herein with specific examples. The description about the embodiments is merely provided to help understand the technical solutions of the present disclosure and core ideas thereof. It is to be noted that those of ordinary skill in the art can also make improvements and modifications to the present disclosure without departing from the principle of the present disclosure. Such improvements and modifications also fall within the protection scope of the claims of the present disclosure.

What is claimed is:

1. A node mode adjustment method for a storage cluster in the case of Battery Backup Unit (BBU) failure, wherein the storage cluster comprises a plurality of IO GROUPs, each of the IO GROUPs comprises two nodes, and each node is connected to a BBU corresponding to the node, the method comprising:

monitoring a state of each BBU in the storage cluster; and after detection of any failed BBU, when it is determined that a BBU connected to a peer node of the node to which the failed BBU is connected does not fail and it is determined that the storage cluster is not degraded, maintaining the node connected to the BBU detected to be failed and the peer node of the node in a write-back mode;

wherein the after detection of any failed BBU, the method further comprises:

when it is determined that the BBU connected to the peer node of the node to which the failed BBU is connected does not fail and it is determined that the storage cluster is in a degraded state, switching the node connected to the failed BBU in the IO GROUP to a maintenance mode, and switching the node connected to the non-failed BBU to a write-through mode.

2. The node mode adjustment method for a storage cluster in the case of BBU failure according to claim 1, subsequent to the step of maintaining the node connected to the BBU detected to be failed and the peer node of the node in a write-back mode, further comprising: outputting first prompt information indicating that a current failure state is nonfatal.

3. The node mode adjustment method for a storage cluster in the case of BBU failure according to claim 1, after detection of any failed BBU, further comprising:

when it is determined that the BBU connected to the peer node of the node to which the failed BBU is connected fails, switching the two nodes in the IO GROUP to a maintenance mode.

4. The node mode adjustment method for a storage cluster in the case of BBU failure according to claim 3, subsequent to the step of switching the two nodes in the IO GROUP to a maintenance mode or subsequent to the step of switching the node connected to the failed BBU in the IO GROUP to a maintenance mode, and switching the node connected to the non-failed BBU to a write-through mode, further comprising:

outputting second prompt information indicating that a current failure state is fatal.

5. The node mode adjustment method for a storage cluster in the case of BBU failure according to claim 1, subsequent to the step of switching the two nodes in the IO GROUP to a maintenance mode or subsequent to the step of switching the node connected to the failed BBU in the IO GROUP to a maintenance mode, and switching the node connected to the non-failed BBU to a write-through mode, further comprising:

outputting second prompt information indicating that a current failure state is fatal.

6. A node mode adjustment device for a storage cluster in the case of BBU failure, the device comprising: a memory configured to store a computer program; and a processor configured to execute the computer program to perform steps of the node mode adjustment method for a storage cluster in the case of BBU failure according to claim 1.

7. A non-transitory computer-readable storage medium, wherein the non-transitory computer-readable storage medium stores a computer program, and when the computer program is executed by a processor, steps of the node mode adjustment method for a storage cluster in the case of BBU failure according to claim 1 is performed.

\* \* \* \* \*